United States Patent Office 2,853,419
Patented Sept. 23, 1958

2,853,419

AQUEOUS FAT EMULSIONS AND PROCESS FOR PREPARING THE SAME

Robert Rudolf Degkwitz, New York, N. Y., assignor to Merck & Co., Inc., Rahway, N. J., a corporation of New Jersey No Drawing. Continuation of application Serial No. 270,291, February 6, 1952. This application September 7, 1956, Serial No. 608,439

11 Claims. (Cl. 167—66)

This invention relates to nutrient, fat emulsions adapted for use in intravenous feeding. More particularly, the invention relates to new stable fat emulsions wherein the fat component comprises a vegetable oil, and to procedure for preparing such stable emulsions. This application is a continuation of Serial No. 270,291, filed February 6, 1952, now abandoned.

In instances where illness, injury or operation prevent the normal ingestion of food, it is frequently the practice to administer solutions of carbohydrates and amino acids intravenously, to meet daily nourishment requirements. Unfortunately however, carbohydrates and amino acids thus administered are excreted rapidly from the body and it is difficult with these materials alone to maintain desired caloric levels in the body by intravenous feeding. Nutrient fats and oils, on the other hand, are less rapidly excreted, but it has been difficult in the past to provide nutrient fat or oil preparations in a form suitable for intravenous administration.

I have now discovered, in accordance with the present invention, that emulsions of nutrient fats can be prepared which have properties and characteristics adapting them for use in intravenous feeding, and which have the further advantage of being extremely stable under the conditions normally encountered in storage and handling. These emulsions which contain a nutrient fat as the dispersed phase in water, containing lecithin as an emulsifying agent and a sugar such as dextrose or levulose to provide an isotonic emulsions, derive their characteristic stability from the manner of bringing together the various components and combining these components to form the emulsion.

Regarded in certain of its broader aspects, my invention comprises a stable nutrient fat emulsion suitable for intravenous injection, and prepared by combining an organic solvent solution containing lecithin with a solution of the fat in a lower aliphatic alcohol, adding this mixture to a sugar solution while subjecting the resulting mixture to very rapid stirring, continuing the stirring until the temperature of the mixture reaches about 43–45° C., and then removing the organic solvents from the resulting emulsion by partial evaporation under vacuum.

In carrying out the process of my invention, a solution of the fat to be emulsified is prepared by dissolving the same in a lower aliphatic alcohol. I preferably employ propanol or isopropanol, since these alcohols provide an optimum combination of solubility for fats and ease of evaporation from the completed emulsion. Other alcohols can be used, but higher alcohols cannot so readily be removed by evaporation from the completed emulsion and lower alcohols, being poorer fat solvents, must be employed in larger amounts.

While various nutrient fats can be employed in preparing my emulsions, I prefer to use vegetable oils, and among these sesame oil and olive oil have been particularly effective in preparing stable emulsions for intravenous injection.

The alcohol solution of fat is then combined with a solution of lecithin in a volatile organic solvent which is also a solvent for the fat to be emulsified. This solvent thus acts both to dissolve the lecithin and to increase the dispersability of the fat in water during emulsification. I prefer to use chloroform as the solvent for dissolving lecithin, but other solvents can be employed for this purpose, including in particular ethyl ether and petroleum ether.

While lecithin can be obtained from various sources, I have found that soy bean lecithin or egg lecithin give the best resutls in preparing my stable fat emulsions. These lecithins are physiological substances which can be injected intravenously without adverse effect and have the further advantage of being unaffected by autoclaving of the completed emulsion.

Th lecithin-fat-solvent mixture is then stirred with water containing sugar such as dextrose or levulose in an amount sufficient to render the final emulsion isotonic, and the resulting mixture is agitated with a mechanical stirrer operating at 8000–9000 revolutions per minute until the mixture reaches about 43–45° C. The stirring speed and the temperature at which stirring is stopped appear to be primary factors in obtaining a stable emulsion. If stirring is stopped before reaching a temperature of 43–45° C., the particle size of the dispersed phase may be too large to provide a stable emulsion, whereas continuing the stirring until the temperature substantially exceeds 45° C. the particles may become too small for optimum stability.

The size of the dispersed particles, which as above noted is extremely important to the stability of the emulsion, will depend in part upon the relative volumes of fat (or oil), organic solvents, and water which are subjected to mechanical agitation. When emulsifying a vegetable oil, for example, I have found that a ratio of one volume of oil to one volume of combined organic solvents to 2.5 volumes of water give best results and provide an emulsion in which 99% or more of the dispersed particles have a diameter within the range of about 0.5–1.0 microns. If less organic solvents are used to dissolve the lecithin and the fat, emulsions are obtained which have a larger particle size and which cannot be as easily injected intravenously. Too large a volume of solvents, on the other hand, results in emulsions containing particles so small as to require excessive amounts of stabilizer. Variations in the amount of water have the reverse effect, i. e., increasing the proportion of water results in increased particle size of the dispersed phase, while reduction in the proportion of water gives an emulsion having particles of smaller size.

After stirring the emulsion until a temperature of about 43–45° C. is reached, the resulting emulsion is subjected to low pressure evaporation at a temperature of 15–50° C. and pressure of 1–5 mm. of mercury to effect a removal of the organic solvents together with a portion of the water. For each volume of organic solvent removed, a proportionate volume of water is also removed. The volume of water thus removed may be generally equivalent to the volume of organic solvent although the actual ratio of organic solvent to water thus removed will of course, depend upon the particular organic solvents and relative proportions thereof used in making the emulsion. It has been found however that when the emulsion components are combined in the appropriate ratio of one volume of oil to one volume of combined organic solvents to 2.5 volumes of water as described above, the evaporation step for removing organic solvents does not impair in any way the stability of the final emulsion. This evaporation may frequently remove sufficient water to produce a more concentrated emulsion than is desired for infusion purposes. It should be noted, however, that concentration of fat in the emulsion can be adjusted as desired by addition of water or by further low pressure evaporation without affecting the stability of emulsion.

Emulsions prepared as above described which are generally most suitable for administration, as for example by intravenous injection, are emulsions which contain about 10–30% of oil, and such emulsions are stabilized by the use of about .05–2.0% of lecithin (both percentages being based upon the final concentration of the emulsions). In other words, on a weight basis one part of lecithin is used to stabilize each 15–20 parts of oil. In instances where more than one liter of an emulsion is to be administered in a short period of time, it is preferable to limit the lecithin content of the emulsion to about one percent in order to prevent possible adverse side effects which may occur if excessive amounts of lecithin are administered in a short time interval. Thus, for emulsions which are to be administered in amounts of more than one liter at a time, the proportion by weight of oil to lecithin may be increased to about 30 parts of oil to each part of lecithin.

I have found that emulsions containing 10–30% fat are rendered substantially isotonic by about 5% of dextrose or levulose. Expressed on a weight basis, one part of the sugar is employed for each 2–6 parts of fat.

It should be noted however that the required amount of sugar should all be added with the water when the emulsion is initially formed by stirring. As previously mentioned, the emulsion may be diluted with water after formation either before or after evaporation of the organic solvents. It appears however that attempts to increase the amounts of sugar after the emulsion has been initially formed may tend to interfere with or destroy the emulsion stability.

Since my emulsions are intended primarily for parenteral injection, it will be understood that appropriate steps must be taken to assure that the products are sterile and also that they are substantially free of pyrogens. In this connection, it should be noted that the emulsions are not adversely affected when sterilized by autoclaving, as for example for 30 minutes at 120° C. Thus, sterilization of the emulsions can readily be effected. As for the control of pyrogen content this is best effected by employing pyrogen-free components in making the initial emulsion, and carrying out successive steps under pyrogen-free conditions.

The following example will show how the procedures for preparing my stable fat or oil emulsions can be carried out, but it will be understood that this example is given by way of illustration and not of limitations.

*Example*

A 100 gm. portion of soya bean lecitihin was dissolved in 500 cc. of ethyl ether, followed by centrifugation in order to remove denatured proteins and other insoluble material. Approximately one liter of acetone was slowly added to the ether solution and after 24 hours standing, the solvents were decanted from the precipitated lecithin. The precipitate was further washed twice by decantation with one-liter portions of acetone, decantation followed after standing 24 hours in each case. The lecithin was finally filtered and dried in vacuo at room temperature. This purification was observed to decrease the pyrogen content to not more than 0.05 unit per 60 milligrams of lecithin.

A quantity of sesame oil to be emulsified was filtered through activated charcoal to free it of pyrogens.

To 200 cc. of the pyrogen-free sesame oil, 133 cc. of isopropanol was added. To this mixture was added 6 gms. of soya bean lecithin (purified as above described) dissolved in 66 cc. of chloroform, and finally 500 cc. of pyrogen-free water contaiinng 50 gms. of dextrose was added. This mixture at a temperature of about 20° C. was stirred in a high speed stirrer at 8000–9000 revolutions per minute until the emulsion temperature reached 45° C. Then 500 cc. of water was added while stirring. The emulsion was then cooled to 10° C., placed in a long tube evaporator, and brought under a vacuum of about 1–5 mm. of mercury. While the emulsion was rotated in the apparatus, the emulsion was concentrated at a temperature of 20° C., which was gradually raised to 45° C., until 200 cc. of solvents and 200 cc. of water were removed, leaving 1000 cc. of an emulsion containing 200 cc. sesame oil, 800 cc. of water, 50 gms. of dextrose and 6 gms. of lecithin. The emulsion was then sterilized by autoclaving for 30 minutes at 120° C.

Emulsions prepared as above described and similar emulsions wherein olive oil was employed in place of the sesame oil have been stored for extended periods of time at room temperature and under refrigeration without showing any signs of separation or chemical change. In addition, samples of such emulsions have been transported by train and truck without any impairment of their stability.

While sesame oil and olive oil are thus far considered to be the most suitable vegetable fats for preparation of my nutrient emulsions, it should be understood that other vegetable oils can be employed. In this connection, however, it should be noted that the oils selected for emulsification should be limited to those which remain clear and liquid at temperatures within the range of 0–15° C.

While the procedures which I have disclosed are effective in preparing emulsions of other oils which may become solidified or become turbid within the range of 0–15° C., such emulsions do not have the desired stability, particularly when stored under refrigeration or subjected to normal temperature fluctuations. Oils which remain clear and fluid within the temperature range of 0–15° C. form emulsions according to my process which are extremely stable and which exhibit no physical or chemical change throughout a temperature range of about 0–120° C.

Various changes and modifications in the procedures herein described may occur to those skilled in the art, and to the extent that such changes and modifications fall within the purview of the appended claims, it is to be understood that they constitute part of my invention.

I claim:

1. In the process of preparing an aqueous fat emulsion which is stable to autoclaving and adapted for intravenous injection, and which comprises a vegetable oil and lecithin as an emulsifying agent in an aqueous medium, the improvement that comprises effecting emulsification in the presence of a readily volatile organic liquid, which is solvent for both the vegetable oil and lecithin and which consists of a mixture of a water miscible organic solvent and a water immiscible organic solvent, and removing the organic liquid from the resulting emulsion.

2. The process of claim 1 wherein the organic liquid consists of a mixture of a lower alkanol and a water immiscible organic solvent selected from the group consisting of chloroform, ether, and petroleum ether.

3. The process of claim 1 wherein the organic liquid consists of a mixture of ethanol and chloroform.

4. The process of claim 1 wherein the lecithin and vegetable oil are employed in proportions of about 1 part lecithin to 15 to 30 parts oil.

5. The process of claim 1 wherein the lecithin and vegetable oil are employed in the proportion of about 1 part lecithin to 30 parts oil.

6. A stable aqueous fat emulsion for intravenous injection, prepared by the mixed solvent emulsification procedure as defined in claim 1, wherein the dispersed particles are predominantly of a diameter within the range of 0.5 to 1.0 micron, individual dispersed particles comprising a mixture of lecithin and a vegetable oil which remains clear and fluid at temperatures of 0–15° C., the lecithin being present in the proportion of about 1 part for each 15 to 30 parts of oil, and the oil being present in the amount of about 10 to 30% of the emulsion.

7. The stable aqueous fat emulsion of claim 6 wherein the lecithin is present in the proportion of about 1 part for each 30 parts of oil and the oil is present in the amount of about 10% of the emulsion.

8. The stable aqueous fat emulsion of claim 6 wherein the vegetable oil is sesame oil.

9. The stable aqueous fat emulsion of claim 6 wherein the vegetable oil is olive oil.

10. The stable aqueous fat emulsion of claim 6 wherein the continuous phase contains dissolved sugar in the amount of about 5% of the emulsion.

11. The sterile aqueous fat emulsion of claim 6 wherein the sugar is selected from the class consisting of dextrose and levulose.

References Cited in the file of this patent

Geyer et al.: J. Lab. and Clin. Med., 34, 1949, pp. 688–698.

Lambert et al.: Am. J. Physiol., 164, 1951, pp. 490–496.

Freeman: Progress in the Chem. of Fats and Other Lipids, Pergamon Press, N. Y., 1955, pp. 2–17.